United States Patent [19]

Yumoto

[11] Patent Number: 4,545,397
[45] Date of Patent: Oct. 8, 1985

[54] FLOAT VALVE ASSEMBLY

[75] Inventor: Hideaki Yumoto, Kakogawa, Japan

[73] Assignee: TLV Co., Ltd.

[21] Appl. No.: 539,535

[22] Filed: Oct. 6, 1983

[30] Foreign Application Priority Data

Oct. 8, 1982 [JP] Japan .................. 57-177766

[51] Int. Cl.⁴ .............................. F16T 1/20
[52] U.S. Cl. .................... 137/192; 137/270; 236/53
[58] Field of Search ............ 137/192, 269, 270; 236/52, 53, 59

[56] References Cited

U.S. PATENT DOCUMENTS

| | | | |
|---|---|---|---|
| 1,962,360 | 6/1934 | Pflugheber | 236/53 |
| 2,550,643 | 4/1951 | Mainwaring et al. | |
| 3,489,164 | 1/1970 | Fujiwara | 137/192 |
| 3,489,348 | 1/1970 | Fujiwara | 137/192 X |

FOREIGN PATENT DOCUMENTS

| | | |
|---|---|---|
| 1067446 | 1/1963 | Fed. Rep. of Germany . |
| 976634 | 1/1964 | Fed. Rep. of Germany . |
| 1121107 | 3/1966 | Fed. Rep. of Germany . |
| 1243692 | 7/1967 | Fed. Rep. of Germany . |
| 2415286 | 10/1975 | Fed. Rep. of Germany . |
| 1941776 | 11/1975 | Fed. Rep. of Germany . |
| 551874 | 3/1943 | United Kingdom . |
| 857061 | 8/1958 | United Kingdom . |
| 1419747 | 12/1975 | United Kingdom . |
| 2025000 | 1/1980 | United Kingdom . |

Primary Examiner—Alan Cohan
Attorney, Agent, or Firm—Toren, McGeady, Stanger, Goldberg & Kiel

[57] ABSTRACT

A float valve assembly capable of operating as a steam trap for discharge of fluid from a system wherein a float operates to open and close an orifice located in a valve seat, the valve assembly being adapted to be easily converted for use in either horizontal flow lines or vertical flow lines by altering the relative position of internal components of the system.

4 Claims, 3 Drawing Figures

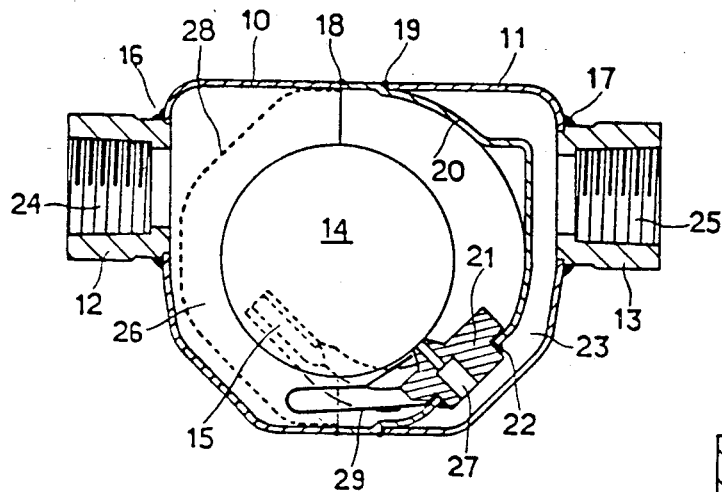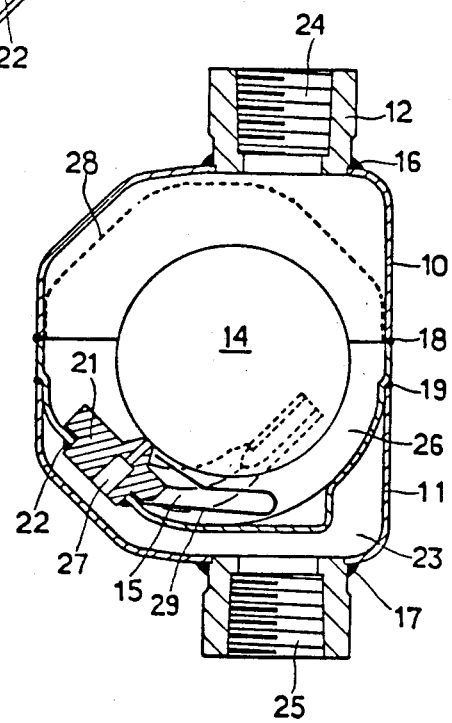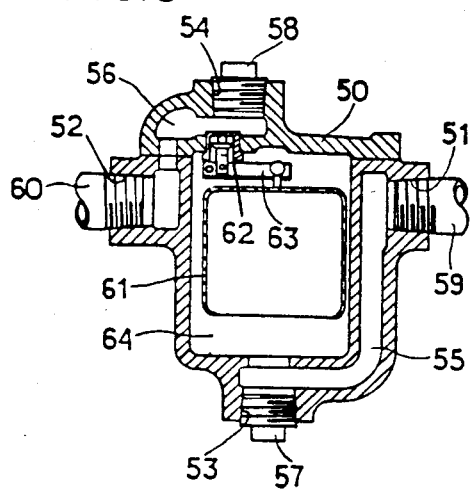
(PRIOR ART)

FLOAT VALVE ASSEMBLY

The present invention relates generally to valve assemblies which are utilized to automatically discharge either gas or liquid from a fluid flow system where both exist in a mixture. The invention is particularly suitable for use as a steam trap to automatically discharge condensate formed in a steam system or as an air trap to automatically discharge liquid generated in compressed air systems. Additionally, the invention is adapted for use as a vent valve to automatically discharge air existing in water piping systems and it is particularly related to a float valve which utilizes the difference is density between gas and liquid in the system.

Float valve assemblies of the type to which the present invention relates operate to automatically discharge either gas or liquid by opening and closing an orifice by means of a float member which rises and falls in accordance with the liquid level in the float assembly. The orifice is usually arranged at the upper portion of the valve chamber in a case where gas is discharged and, in a case where liquid is to be discharged, the orifice is located a lower portion of the valve chamber, since gas separates from the liquid and collects at the upper portion thereof.

In float assemblies of this type, during operation, the float member undergoes substantial vertical movement when the orifice is arranged at the upper or lower portion of the valve chamber. Accordingly, in a float valve of this type, when it is necessary to provide for installation in either a horizontal or a vertical flow line, the float valve must be provided in two different models to accommodate either for a horizontal installation which will have inlet and outlet openings spaced horizontally apart, or for vertical installations where the inlets and outlets will be vertically oriented relative to each other.

Thus, in the prior art, steam traps have been structured with two inlets and two outlets in order to accommodate for the capability to enable installation in both horizontal and vertical flow lines. It will be appreciated that such a steam trap requires increased complexity in its structure and increase in the cost of manufacture thereof.

Therefore, the present invention is directed toward providing a float valve assembly having a single inlet and a single outlet which may be easily converted for use in either a horizontal or vertical flow line with only minor modification or adjustment of the device.

SUMMARY OF THE INVENTION

Briefly, the present invention may be described as a float valve assembly comprising: valve casing means having a single valve inlet and a single valve outlet and defining a valve interior; partition means dividing said valve interior to define therein a valve chamber in flow communication with said single valve inlet and a flow passage in communication with said single valve outlet; valve seat means defining orifice means in flow communication between said valve chamber and said flow passage; and float means located within said valve chamber operating to engage and disengage said valve seat means in accordance with the level of condensate within said valve chamber to close and open said orifice means; said valve seat means and said orifice means being located relative to said single valve inlet and said single valve outlet to effect opening and closing operations of said float means both when said single valve inlet and said single valve outlet are connected within a horizontal flow line and when they are connected within a vertical flow line.

The invention also provides a float guide member located adjacent said valve seat means operative to guide the float means into engagement with the valve seat means, the float guide member being adapted to be adjustably positioned relative to the valve seat means to adapt the assembly for operation within either a horizontal flow line or a vertical flow line. In accordance with a more specific aspect of the invention, the assembly may be adapted for a horizontal or vertical installation by adjustment of the float guide member through an angle of 180°.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings

FIG. 1 is a sectional view of a float valve assembly in accordance with the present invention shown as adapted for installation in a horizontal flow line;

FIG. 2 is a sectional view of the float assembly shown in FIG. 1 adapted for installation in a vertical flow line; and FIG. 3 is a sectional view of a conventional steam trap structured in accordance with the prior art.

DETAILED DESCRIPTION OF THE PREFERRED EMBODIMENT

In order to provide an understanding of the environment of the present invention, there will first be described a float type of steam trap in accordance with the prior art which is shown in FIG. 3 and which is of the type disclosed in U.S. Pat. No. 2,550,643. This type of float valve is one which is adapted for utilization in both horizontal and vertical installations. In the case of the prior art steam trap depicted in FIG. 3, there is provided a pair of inlets 51 and 53 and a pair of outlets 52 and 54. The inlets and outlets are provided at the sides of a valve casing 50, and the two inlets 51 and 53 are in flow communication with each other through a passage 55 located outside of a valve chamber 64 defined within the casing 50. The two outlets 52 and 54 are in flow communication with each other through a passage 56. When the steam trap shown in FIG. 3 is installed in a horizontal line, the inlet 53 at the bottom of the casing 50 is closed by a plug 57 and the outlet 54 is closed with a plug 58. An inlet pipe 59 is connected to the inlet 51 and a discharge pipe 60 is connected to the outlet 52. When the device shown in FIG. 3 is to be installed in a vertical line, the inlet 51 and the outlet 52 are plugged and the inlet and discharge pipes 59 and 60 are connected, respectively, with the inlet 53 and the outlet 54. The assembly contains an open float 61, a valve body 61, and a lever 63.

In this type of steam trap, the two plugs 57 and 58, which must be supplied for either set of inlets and outlets, are additional elements which must be provided in order to adapt the steam trap to both horizontal and vertical installations. However, with the present invention, there is provided a float valve assembly wherein only one inlet and one outlet may be provided, with the valve assembly being easily converted for horizontal or vertical installations.

A preferred embodiment of the present invention is shown in FIGS. 1 and 2, with FIG. 1 showing the assembly adapted for connection in a horizontal flow line and FIG. 2 showing the device adapted for installation in a vertical flow line.

Referring now to FIGS. 1 and 2, the construction of the steam trap assembly in accordance with the present invention is shown as including valve casing members 10 and 11 which are formed of pressed stainless steel sheet material. These members are approximately cup-shaped and are formed symmetrically relative to each other with a small flat slanted side extending at about a 45° angle.

The assembly is provided with an inlet 12 and an outlet 13 which are welded to the casing members 10 and 11, respectively, at welds 16 and 17. The inlet 12 and the outlet 13 are mounted at a location biased slightly upward. The inlets are provided with threaded connections 24 and 25 in order to enable piping to be attached to the assembly.

At the inside of the inlet valve casing member 10, there is provided a screen 28 having an approximately hemispherical configuration mounted by spot welding at several points. The screen 28 is made of perforated stainless sheet steel formed by a pressing operation.

A partition member 20, also formed as a pressed stainless steel sheet member with an approximately hemispherical configuration, is also provided within the casing members. The open end portion of the partition member 20 is cylindrical in shape and is formed with the same diameter as that of the open end portion of the valve casing members 10 and 11.

At the lower part of the partition member 20 there is mounted a valve seat member 21 having an orifice 27, the seat member 21 being mounted by a weld 22. The seat member 21 is provided with a float guide member 15 which comprises two parallel legs extending at a distance in the direction of the radius of the float 14 from the axis of the orifice 27. Additionally, a U-shaped bimetallic member 29 is mounted with one end inserted between the valve seat member 21 and the partition member 20.

The casing members 10 and 11 are welded to both sides of the cylindrical end portion of the partition member 20 at 18 and 19, and a passage 23 is provided between the partition member 20 and the outlet valve casing member 11 with a valve chamber 26 being defined between the partition member 20 and the inlet valve casing 10.

The float member 14 is formed as a hollow spherical member which is made of stainless steel sheet material and which is freely movable in the valve chamber 26.

In the operation of the float valve assembly in accordance with the invention, the inlet 24 is piped to a steam draining point within an equipment line and condensate and steam flow into the valve chamber 26. The condensate is separated from the steam and is accumulated in the lower portion of the valve chamber 26. When the condensate level rises, the float 14 will rise due to buoyancy thereby opening the orifice 27. Condensate in the valve chamber 26 will pass through the orifice 27 and into the passage 23 and will flow out through the outlet 25. When the level of the condensate falls due to discharge, the float 14 will fall and will close the orifice 27 to prevent escape of steam. The float 14 is guided in its movement by the float guide member 15 and rests thereupon when closing the orifice 27. This cycle is automatically repeated during operation of the valve assembly.

When it is desired to utilize the valve assembly of the invention as a steam trap for installation in vertically directed flow lines, the arrangement of FIG. 2 is utilized. In FIG. 2, similar reference numerals are used to identify similar parts as in FIG. 1. The only difference between the device shown in FIG. 1 and that shown in FIG. 2 is that the valve seat member 21, the float guide member 15, and the bimetallic member 29 are in a position rotated 180° about the axis of the valve seat member as compared with the horizontal installation shown in FIG. 1. Thus, the float valve assembly for vertical installation may be adapted merely by changing the arrangement of internal elements relative to the partition member 20. Assembly and operation of the device of FIG. 2 are the same as those in connection with FIG. 1, and a detailed description thereof is therefore omitted.

The float valve described above with reference to FIGS. 1 and 2 may be used not only as a steam trap, but also as an air trap to discharge condensate generated in compressed air systems merely by removing the bimetallic element 29.

Furthermore, the float valve shown in FIG. 2, if inverted, could be used as an air vent to vent air from water piping systems, again provided that the bimetallic element 29 is removed.

In the embodiment described, the inlet side valve casing 10 and the outlet side valve casing 11 are made symmetrical in shape and therefore are formed as a common part. The valve casing members and the partition member are made of pressed stainless steel sheet material to make the valve assembly lighter in weight. Since all of the structural elements of the valve, such as the casing members and the partition member, are cylindrical in shape and have the same diameter, welding of joints is greatly facilitated.

Thus, it will be seen that the present invention provides a float valve assembly wherein, with only a single inlet and a single outlet, the valve assembly may be easily converted for installation in either a horizontal or a vertical flow line. Since with the float valve, gas is separated from liquid which moves to the bottom of the valve, the internal elements may be easily changed in relative position depending upon the installation position of the valve casing. The invention therefore makes it possible to alter the relative position of the internal elements relating to separation of liquid and gas and the motion of the float, depending upon the horizontal or vertical installation of the valve casing where the inlet and outlet are located.

With the present invention, several advantages arise. The portion of the partition between the valve chamber and the orifice ranging at least from the orifice to the outlet, is made of a separate member from the valve casing having the inlet and outlet and is capable of being installed at the required position in the valve chamber. The members relating to the liquid-gas separation and the motion of the float are installed at the required location of the partition member depending on the installation position of the valve casing.

As a result, a float valve adapted for either horizontal or vertical installation may be achieved by attaching the partition member provided with the internal elements in accordance with the installation position of the valve casing having a pair of openings comprising the inlet and the outlet.

The distinctive effects of the invention include the fact that the invention greatly reduces the cost of stock items because the valve casing is common for both the horizontal and the vertical flow line valve. The invention enables achievement of another type of float valve by changing the partition member and the internal elements with no modification of the valve casing. Therefore, the valve casing becomes a common element regardless of the type of float valve which is to be provided.

Furthermore, the present invention makes it easy to process the partition member and mount the internal elements.

While a specific embodiment of the invention has been shown and described in detail to illustrate the application of the inventive principles, it will be understood that the invention may be embodied otherwise without departing from such principles.

What is claimed is:

1. A float valve assembly comprising: valve casing means having a single valve inlet and a single valve outlet and defining a valve interior; partition means dividing said valve interior into a valve chamber which is in flow communication with said single valve inlet and into a flow passage which is in communication with said single valve outlet; valve seat means defining orifice means between said valve chamber and said flow passage; float means located within said valve chamber operating to engage and disengage said valve seat means in accordance with the level of condensate within said valve chamber to close and open said orifice means; said valve seat means and said orifice means being located relative to said single valve outlet to effect opening and closing operation of said float means both when said single valve inlet and single valve outlet are connected within a horizontal flow line and when they are connected within a vertical flow line; and a float guide member adapted to engage said float means to urge said float means into engagement with said valve seat means, said float guide member being adapted to be adjustably positioned relative to said valve seat means to adapt said assembly for operation within either a horizontally extending flow line or a vertically extending flow line.

2. An assembly according to claim 1 wherein said valve casing is formed in two parts which consist of an inlet side member defining therethrough said single valve inlet and an outlet side member defining therethrough said single valve outlet, said two parts being formed with a symmetrical configuration.

3. An assembly according to claim 1 wherein said float guide member is adjusted by movement through an angle of 180° relative to said orifice means in order to adapt said valve assembly to installation within a vertically or a horizontally extending flow line.

4. An assembly according to claim 1 wherein said valve seat means, said orifice means, and said float guide member are all rotated about an angle of 180° to adjust said float valve assembly to utilization within either a horizontally or vertically extending flow line.

* * * * *